(12) United States Patent
Luo et al.

(10) Patent No.: US 8,191,214 B2
(45) Date of Patent: Jun. 5, 2012

(54) METHOD FOR MAKING LYOCELL WEB PRODUCT

(75) Inventors: Mengkui Luo, Auburn, WA (US); David George Unrau, Federal Way, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 515 days.

(21) Appl. No.: 12/347,631

(22) Filed: Dec. 31, 2008

(65) Prior Publication Data

US 2010/0162542 A1    Jul. 1, 2010

(51) Int. Cl.
*D04H 1/46*    (2006.01)
*B32B 37/00*    (2006.01)

(52) U.S. Cl. ............ 28/103; 28/104; 156/62.2; 156/148

(58) Field of Classification Search .................... 28/104, 28/105, 103, 167; 156/148, 308.2, 60, 62.2, 156/62.6; 442/387, 408, 385, 388, 403, 389; 428/326, 508, 527, 536
See application file for complete search history.

(56) References Cited

U.S. PATENT DOCUMENTS

| | | | |
|---|---|---|---|
| 5,591,150 A | 1/1997 | Olsen et al. | |
| 5,599,366 A | 2/1997 | Hassenboehler, Jr. et al. | |
| 5,683,794 A | 11/1997 | Wadsworth et al. | |
| 5,747,394 A | 5/1998 | Hassenboehler, Jr. et al. | |
| 5,839,448 A * | 11/1998 | Woodings ..................... | 131/331 |
| 5,877,097 A | 3/1999 | West et al. | |
| 6,306,334 B1 * | 10/2001 | Luo et al. ..................... | 264/561 |
| 6,518,479 B1 * | 2/2003 | Graef et al. ..................... | 604/383 |
| 6,841,038 B2 * | 1/2005 | Horenziak et al. ............ | 162/129 |
| 6,921,655 B1 | 7/2005 | Nakamura et al. | |
| 7,067,444 B2 | 6/2006 | Luo et al. | |
| 7,779,521 B2 * | 8/2010 | Topolkaraev et al. .......... | 28/104 |
| 2002/0123727 A1 * | 9/2002 | Edmark et al. ................ | 604/366 |
| 2004/0044319 A1 | 3/2004 | Bewick-Sonntag et al. | |
| 2004/0140048 A1 * | 7/2004 | Lindsay et al. ................ | 156/209 |
| 2005/0010183 A1 * | 1/2005 | Miller et al. ................... | 604/367 |
| 2005/0072542 A1 | 4/2005 | Sears et al. | |
| 2006/0009744 A1 | 1/2006 | Erdman et al. | |
| 2007/0022586 A1 * | 2/2007 | Sommer et al. ................ | 28/104 |
| 2008/0000057 A1 * | 1/2008 | Nguyen ........................ | 28/104 |
| 2010/0130086 A1 * | 5/2010 | Dorsey et al. ................ | 442/402 |
| 2011/0124258 A1 * | 5/2011 | White et al. .................. | 442/408 |

FOREIGN PATENT DOCUMENTS

WO    2007124521 A1    11/2007
WO    2007124522 A1    11/2007

OTHER PUBLICATIONS

Nonfinal office action (Notification Date -Jan. 20, 2011) U.S. Appl. No. 12/347,592, filed Dec. 31, 2008 First Named Inventor: Mengkui Luo.

* cited by examiner

*Primary Examiner* — Amy Vanatta

(74) *Attorney, Agent, or Firm* — John M. Crawford; Weyerhaeuser Law Dept

(57) ABSTRACT

A method for making a web comprising a layer of crosslinked cellulosic fiber overlaid on and fastened to at least one layer of regenerated cellulose fiber. In one method the crosslinked cellulosic fiber is be sandwiched between two regenerated cellulose fiber layers. The regenerated cellulose can be viscose or lyocell or be made from several solvents.

20 Claims, No Drawings

METHOD FOR MAKING LYOCELL WEB PRODUCT

CROSS-REFERENCE TO RELATED APPLICATION

Related patent application includes U.S. patent application Ser. No. 12/347,592, filed Dec. 31, 2008, and titled "Lyocell web product".

This application relates to regenerated cellulose nonwoven webs and articles made therefrom.

Lyocell is a regenerated cellulose material made by dissolving cellulose in a mixture of N-methylmorpholine-N-oxide (NMMO) and water and extruding the solution into a regenerating bath, usually water. Other solvents that can be used are ionic liquids, ionic liquid/water, ionic/organic solvent mixture. Lyocell is a generic term for a fiber composed of cellulose precipitated from organic solution in which no substitution of hydroxyl groups takes place and no chemical intermediates are formed. Several manufacturers presently produce lyocell fibers. For example, Lenzing, Ltd, presently manufacturers and sells Tencel® fibers.

Lyocell fibers are particularly suitable for use in nonwoven applications because of their characteristic soft feel, water absorption, microdiameter size, biodegradability and the ability of these fibers to be combined in the spinning process to form either selfbonded or spunlaced webs. Fibers made from pulp with high hemicelluloses content are particularly suited for this application because of the added interfiber bonding attributed to hemicelluloses.

Most lyocell fibers are produced from high quality wood pulps that have been extensively processed to remove non-cellulose components, especially hemicelluloses. These highly processed pulps are referred to as dissolving grade or high α (high alpha) pulps, in which the term α refers to the percentage of cellulose remaining after extraction with 17.5% caustic. Alpha cellulose can be determined by TAPPI 203. Thus a high α pulp contains a high percentage of cellulose, and a correspondingly low percentage of other components such as hemicelluloses. The process required to generate a high α pulp significantly adds to the cost of lyocell fibers and products manufactured from these fibers. Typically, the cellulose for these high α pulps comes from both hardwoods and softwoods; softwoods generally having longer fibers than hardwoods.

A lower cost alternative to high α dissolving grade pulps is a low α pulp having a higher percentage of hemicelluloses. These low α pulps will have, preferably, a low copper number, a low lignin content and a low transition metal content and a broad molecular weight distribution.

Pulps which meet these requirements for low α pulps have been made and are described in U.S. Pat. Nos. 6,979,113, 6,686,093 and 6,706,876, assigned to the assignee of the present application. While high alpha pulps are also suitable for use in the present application, low alpha pulps such as Peach® pulp, available from Weyerhaeuser Company, Federal Way, Wash., are suitable. These lower alpha pulps provide the benefit of lower cost and better bonding for nonwoven textile applications because of their high hemicelluloses content. Selected Peach® pulp properties are given in Table 1.

TABLE 1

| Peach ® pulp properties | |
|---|---|
| $S_{18}$ % | 8-19 |
| % Xylan | 2-9 |
| % Mannan | 2-8 |
| % α cellulose | 80-91 |
| IV, dl/g | 2.5-4.5 |
| Cu no. g/100 g pulp | <1.0 |
| Mn, Fe, Cu, ppm each | <10 |
| Si ppm | <65 |
| Extractives % | <0.05 |

The term hemicelluloses refer to a heterogeneous group of low molecular weight carbohydrate polymers that are associated with cellulose in wood. Hemicelluloses are amorphous branched polymers, in contrast to cellulose which is a linear polymer. The principal simple sugars that combine to form hemicelluloses are: D-glucose, D-xylose, D-mannose, L-arabinose, D-galactose, D-glucuronic acid and D-galaturonic acid.

In one embodiment the lyocell fibers are made from a pulp with greater than about three percent by weight hemicelluloses. In another embodiment the fibers are made from a pulp with greater than about eight percent by weight hemicelluloses. In yet another embodiment the fibers are made from a pulp with greater than about twelve percent by weight hemicelluloses.

In one embodiment the lyocell fibers contain from about 4 to about 18% by weight hemicelluloses as defined by the sum of the xylan and mannan content of the fibers. In another embodiment the lyocell fibers contain from about 5 to about 10% weight hemicelluloses and in yet another embodiment the fibers contain from about 9% to about 12% by weight hemicelluloses.

Lyocell fibers can be spun by various processes. Any of the following four processes may be used to make nonwoven fabrics of the present application.

In one embodiment the lyocell fiber is spun by the "spunbonding" process. The process is similar to meltblowing. In "spunbonding" the fiber is extruded into a tube with controlled air temperature and humidity and stretched by an air flow through the tube caused by a vacuum at the distal end or the fiber is extruded into an air gap, then coagulation bath and stretched by flowing water. In general, spunbonded synthetic fibers are longer then meltblown synthetic fibers which usually come in discrete shorter lengths. In the present application the fibers are continuous.

In another embodiment the lyocell fiber is spun by a "centrifugal spinning" process. The "centrifugal spinning" process differs from meltblowing in that the polymer is expelled from apertures in the sidewalls of a rapidly spinning drum. The fibers are stretched somewhat by air resistance as the drum rotates. However, there is not usually a strong air stream present as in meltblowing.

In another embodiment the fiber is spun by a dry jet wet process. In this process the filaments exiting the spinneret orifices pass through an air gap before being submerged and coagulated in a liquid bath where the fiber is stretched mechanically.

In another embodiment the lyocell fiber is spun by the "meltblown" process. Where the term meltblown is used it will be understood that it refers to a process that is similar or analogous to the process used for the production of thermoplastic fibers, even though the cellulose is in solution and the spinning temperature is only moderately elevated. Fibers formed by the meltblown process can be continuous or discontinuous depending on the air velocity, air pressure, air temperature, viscosity of the solution, D.P. of the cellulose and combinations of these variables. In the continuous process the fibers are taken up by a reel and optionally stretched. In one embodiment for making a nonwoven meltblown lyocell fiber web the fibers are contacted with a non solvent such as water (or water NMMO mixture) by spraying, subsequently taken up on a moving foraminous support, washed and dried. The fibers formed by this method can be in a bonded nonwoven web depending on the extent of coagulation or spunlaced. Spunlacing involves impingement with a water jet.

Cellulosic fibers are a basic component of absorbent products such as diapers. These fibers form a liquid absorbent structure, a key functioning element in the absorbent product. Cellulosic fluff pulp, a form of cellulosic fibers, is a preferred fiber for this application because a high void volume or high bulk, liquid absorbent fiber structure is formed. This structure, however, tends to collapse on wetting. The collapse or reduction in fiber structure bulk reduces the volume of liquid which can be retained in the wetted structure and inhibits the wicking of liquid into the unwetted portion of the cellulose fiber structure. Consequently, the potential capacity of the dry high bulk fiber structure is never realized and it is the fiber structure's wet bulk which determines the liquid holding capacity of the overall fiber structure.

Fiber structures formed from chemically crosslinked cellulosic fibers generally have enhanced wet bulk compared to those formed from uncrosslinked fibers. The enhanced bulk is a consequence of the stiffness, twist, and curl imparted to the fiber as a result of crosslinking. Accordingly, crosslinked fibers are advantageously incorporated into absorbent products to enhance their wet bulk.

Polycarboxylic acids have been used to crosslink cellulosic fibers. See, for example, U.S. Pat. Nos. 5,137,537; 5,183,707; and 5,190,563. These references describe absorbent structures containing individualized cellulosic fibers crosslinked with a $C_2$—$C_9$ polycarboxylic acid. Absorbent structures made from these individualized, crosslinked fibers exhibit increased dry and wet resilience and have improved responsiveness to wetting relative to structures containing uncrosslinked fibers. Furthermore, a preferred polycarboxylic crosslinking agent, citric acid, is available in large quantities at relatively low prices making it commercially competitive with formaldehyde and formaldehyde addition products.

Polyacrylic acid (PAA) and polymaleic (PMA) acid have also been used to crosslink cellulosic fibers.

Single layer nonwoven lyocell fiber webs suitable for composite products can be made from dried or never-dried webs. A never-dried nonwoven meltblown lyocell fiber web is laid down on a support and an airlaid crosslinked cellulosic fiber layer is laid down over the lyocell fiber web. The combined web structure is then pressed or embossed or spunlaced either from one or both sides. The resulting web is then dried. Alternatively the never-dried nonwoven meltblown lyocell fiber web can be dried, combined with one or more crosslinked cellulosic fiber layers pressed or embossed or spunlaced from one or both sides, and then dried.

Never-dried multilayer nonwoven meltblown lyocell fiber webs are also suitable for manufacture of absorbent products of the present application. A never-dried nonwoven meltblown lyocell fiber web is laid down on a support and an airlaid crosslinked cellulosic fiber layer is laid down over the lyocell web, then another dried nonwoven meltblown lyocell fiber web is laid on top of crosslinked cellulosic fiber layer. The combined web structure is then pressed or embossed or spunlaced either from one or both sides. The resulting web is then dried. Alternatively the never-dried nonwoven meltblown lyocell fiber web can be dried, combined with crosslinked cellulosic fiber layers and another never-dried nonwoven meltblown lyocell fiber web placed on the crosslinked fiber layer on the side opposite the first lyocell fiber web, pressed or embossed or spunlaced from one or both sides, and then dried. The crosslinked cellulosic fiber web is between the two lyocell webs.

The present invention provides nonwoven meltblown lyocell fiber webs that have a wide range of fiber diameters. The nonwoven webs comprise meltblown lyocell fibers of continuous length. In one embodiment the meltblown lyocell fibers in the web have a fiber diameter of from 3 to 30 microns. In another embodiment the meltblown lyocell fibers in the web have a fiber diameter of from 6 to 9 microns. The fiber diameters can range anywhere within 3 to 30 microns.

The basis weight of the individual nonwoven meltblown lyocell fiber webs in the absorbent product can range from about 10 $g/m^2$ to about 300 $g/m^2$. Other embodiments are from about 15 $g/m^2$ to about 125 $g/m^2$, from about 20 $g/m^2$ to about 75 $g/m^2$ and from about 25 $g/m^2$ to about 40 $g/m^2$. Combinations of different basis weights of the nonwoven meltblown lyocell fiber webs can be used.

Cellulose nonwoven web from viscose staple fiber or lyocell staple fiber or cellulose fiber regenerated from cellulose in ionic liquid can be used to substitute lyocell meltblown nonwoven web. Woven or knits from cellulose yarns spun from cellulose staple fibers can be used too.

Regenerated cellulose fibers such as lyocell and viscose are hygroscopic.

The fastening methods for the cellulose webs or its composites with crosslinked pulp airlaid web can be spunlacing, thermobonding, embossing if bicomponent synthetic fiber is blended with cellulose or crosslinked pulp fiber, needlepunching in which fibers are bonded or entangled with needles with barbs, pressure bonding at high pressure, adhesive bonding in which adhesive can be sprayed around the edges or whole area of the composite layers for thermobonding, pressing, bonding, or a combination of the fastening methods. Suitable adhesives can be starch solution, carboxylmethylcellulose solution, polyvinyl alcohol solution, polymer melts from biodegradable polyester, polylactic acid, or combination of these In one embodiment the machine direction tensile strength of the lyocell nonwoven is from about 200 to about 800 N/m, and in another embodiment it is from about 500 to about 700 N/m. In one embodiment the machine direction elongation is from about 3 to about 50%. In another embodiment the machine direction elongation is from about 5 to about 15%, in another it is from about 5 to about 10% and in yet another embodiment it is from 7 to 9%.

In one embodiment the largest pore size of the lyocell nonwoven is less than about 300 microns but greater than about 10 microns. In another embodiment the largest pore size is from about 20 to about 250 microns and in another embodiment the largest pore size is from about 90 to about 200 microns.

In one embodiment the mean flow pore diameter of the lyocell nonwoven is less than about 150 microns but greater than about 5 microns. In another embodiment the mean flow pore diameter is less than about 110 but greater than about 25 microns and in another embodiment it is less than about 80 but greater than about 50. As defined herein, the mean flow pore diameter is the pore diameter at a pressure drop at which the flow through a wetted medium is 50 percent of the flow through the dry medium.

In one embodiment the air flow permeability is from about 100 to about 7500 l/m² sec. In another embodiment the air flow permeability is from about 800 to about 3500 l/m² sec.

Lyocell nonwoven/crosslinked fiber composite can be used as an acquisition/distribution layer (ADL) to replace a current ADL crosslinked fiber layer with lower basis weight for similar performance. ADL from a lyocell nonwoven/crosslinked fiber showed better performance than a lyocell nonwoven/fluff layer (lower acquisition time), or a crosslinked lyocell nonwoven layer (diaper B ADL) due to lower lyocell fiber diameter (Tables 5 and 6).

Single Layer Nonwoven Meltblown Lyocell Fiber Webs

Peach® pulp, available from Weyerhaeuser Company, Federal Way, Wash. was dissolved in NMMO to prepare solutions of 8 to 15 percent by weight level of cellulose in NMMO. Meltblown spinning was conducted using a Reicofil 60 cm width 10 holes/cm meltblow nozzle or a Schwartz type 12.7 cm 20 holes/cm multirow meltblow nozzle and the conditions given in Table 2.

Water was sprayed on the dope strands between the nozzle and the conveyor belt and the fibers collected on a moving conveyor belt. The deposited web was washed again by spraying water using several beams of spray nozzles. The water was collected in a tripartite tank for counter current washing. The last washing step (third washing), used fresh softened water which was collected for the washing stage before the last one or for the second washing stage. The wash water collected from the second wash stage was used for the first stage wash. Water from the first section under the nozzle was pumped to solvent recovery. The NMMO concentration in the wash water of the first bath was approximately 2.5 to 4 percent.

After the last washing the web was passed through a squeeze roll to remove water to a solid content of 9 to 35 percent and then collected on a winder. The collected web, in the wet state, was optionally spunlaced and dried by the screen belt drier method or the screen drum method.

Spunlacing was performed on Aqua Jet equipment from the Fleissner Company, Germany. The unit was equipped with one drum with three beams, each beam having 16 nozzles/cm (40 nozzles/inch) and each nozzle having a diameter of 120μ. The water pressure was 3 bars and the initial water temperature was about 20° C. which increased with running to 30° C. to 40° C. The vacuum was 0.8 bars and the unit was run at a speed of 5 m/min.

Drying was conducted either on a belt drier or a screen drum drier. The hemicellulose content of the fiber in the web ranged from 8.7 percent to 10.1 percent by weight of the fiber, (xylan ranged from 4.5 to 5.3% and mannan from 4.2 to 4.8).

Nonwoven forming conditions are given in Table 2A. The formed nonwoven was wound up in the wet state. Spunlacing and drying were carried out at the Saxon Textile Research Institute (STFI), Chemnitz, Germany using one to three beams and on either one or both sides. Spunlacing and drying were two different steps. After spunlacing the wet nonwoven web was wound up and then dried.

TABLE 2A

Spunlacing and Drying Conditions

| Sample | Spunlacing No. of beams | Spunlacing Pressure per beam psi | | | Drying speed m/minute |
|---|---|---|---|---|---|
| | | 1 | 2 | 3 | |
| A | 1 from one side only | — | 20 | — | 8.5 |
| B | 3 from both sides | 10 | 20 | 50 | 1.8 |
| C | 3 from both sides | 10 | 20 | 50 | 1.8 |

Fiber tensile strength and elongation properties of the samples were carried out based on the nonwoven test methods of EDANA 20.2-89.

In one embodiment the machine direction tensile strength of the lyocell nonwoven web is from about 200 to about 800 N/m, and in another embodiment it is from about 500 to about 700 N/m. In one embodiment the machine direction elongation is from about 3 to about 50%. In another embodiment the machine direction elongation is from about 5 to about 15%, in another it is from about 5% to about 10% and in yet another embodiment it is from 7% to 9%.

The bubble point and the mean pore diameter were determined using the PMI Capillary Flow Porometer using Galwick™ wetting agent with a surface tension of 15.6 dynes/cm. The wetting agent is a fluorinated synthetic polymer. The Porometer measures the diameter of a pore at its most constricted part, the largest pore diameter, the mean pore diameter, the pore distribution, and gas permeability in a porous material. In the method, the pores in the sample are spontaneously filled with a wetting liquid whose surface free energy with the sample is lower than the surface free energy of the sample with a non-reacting gas. Pressure of a nonreacting gas on one side of the sample is slowly increased to remove liquid from pores and permit gas flow through the pores. Measured differential pressures and flow rates of gas through wet and dry conditions of the sample are used to compute pore structure characteristics. The bubble point of the structure is the pressure at which the first stream of bubbles is emitted from the upper surface of the structure and is represented by the largest pore size.

In one embodiment the largest pore size is less than about 300 microns but greater than about 10 microns. In another embodiment the largest pore size is from about 20 to about 250 microns and in another embodiment the largest pore size is from about 90 to about 200 microns.

In one embodiment the mean flow pore diameter is less than about 150 microns but greater than about 5 microns. In another embodiment the mean flow pore diameter is less than about 110 microns but greater than about 25 microns and in

TABLE 2

Nonwoven Forming Conditions

| Sample | Nozzle | | Dope | | | Air | | Belt |
|---|---|---|---|---|---|---|---|---|
| | holes | diameter μm | Conc. % | Temp ° C. | Throughput g/hole/min | flow m³/hour | T ° C. | speed m/min |
| A | 600 | 400 | 7 | 113 | 0.3 | 300 | 122 | 4.2 |
| B | 600 | 400 | 8 | 112 | 0.3 | 300 | 130 | 0.6 |
| C | 600 | 400 | 7 | 110 | 0.6 | 350 | 118 | 0.9 |

Samples were made with the Reicofil nozzle another embodiment it is less than about 80 microns but greater than about 50 microns. As defined herein, the mean flow pore diameter is the pore diameter at a pressure drop at which the flow through a wetted medium is 50 percent of the flow through the dry medium.

Gurley Stiffness was measured by TAPPI T543. Basis weight, caliper, density and bulk were measured by TAPPI T-220; air permeability was measured by TexTest FX 3300 which is based on ASTM D737.

In one embodiment the air flow permeability is from about 100 to about 7500 l/m² sec. In another embodiment the air flow permeability is from about 800 to about 3500 l/m² sec.

Fiber diameters were determined with a light optical microscope. One hundred fibers or fibers/bundles were counted for each sample to obtain the average diameter. Fiber bundles represent two or more coalesced fibers.

Nonwoven lyocell web properties are given in Table 3, and 4.

TABLE 3

Nonwoven lyocell web properties

| Sample | Basis weight g/m² | Caliper mm | Tenacity MD N/m | Tenacity CD N/m | Elongation MD % | Elongation CD % |
|---|---|---|---|---|---|---|
| A | 15 | 0.114 | 220 | 50 | 10.3 | 36.9 |
| B | 48 | — | 910 | 460 | 6.3 | 19.1 |
| C | 80 | 0.379 | 470 | 160 | 6.1 | 29.3 |

TABLE 4

Nonwoven Lyocell Web and Fiber Properties

| Sample | Xylan % | Mannan % | Fiber diameter μ | Largest pore μ | Mean flow pore diameter μ |
|---|---|---|---|---|---|
| A | 4.9 | 4.7 | 7.7 | 271 | 125 |
| C | 4.6 | 4.5 | 10.2 | 158 | 81 |

Another lyocell nonwoven sample made from Peach® pulp using a 50 hole/inch nozzle had a basis weight of 100 g/m² with an average fiber diameter at 7.5 micron. It had a mean flow pore diameter of 9 microns and the largest pore of 32 microns (from bubble point). The caliper of the sample was 0.29 mm, its air permeability was 36.5 cubic feet per minute per square feet. It had a machine direction tensile of 171 N (Newton)/5 cm and machine direction elongation of 14.0%. Tensile properties were measured with TAPPI method T-494.

Crosslinked cellulosic fibers from Weyerhaeuser was airlaid to form sheets at different basis weights and combined with never dried or dried meltblown lyocell webs to make composites at different press pressure and optionally dried if never dried meltblown lyocell nonwoven was used to substitute for the diaper component (ADL layer) for diaper testing (Tables 5 and 6). Weyerhaeuser rewet test measures the liquid acquisition times and rewets for three liquid doses under no load condition. Dosing is done into a dosing ring positioned 2.5 cm front of center. Rewet is measured with a 8.9 cm diameter weight (7 kpa/1 psi) for 2 minutes after each dosing with 11 cm diameter filter paper. Dosage is 100 ml 0.9% saline solution with food coloring. The wicking distance from the point of insult was measured after the 20 minute waiting time after each dose before the rewet was measured. Wicking does not occur as a straight edge away from the point of insult so the distance was measured as the best average of each edge from the front to back of the diaper.

Lyocell nonwoven A is a never dried web with basis weigh about 15 g/m2. It is used to support one or many layers of chemically crosslinked fibers (airlaid) of different basis weight and chemistry The CMC520 fibers are Weyerhaeuser mill or lab produced citric acid crosslinked fibers. The PAAT256 fibers are Weyerhaeuser mill produced PAA crosslinked fiber. NB416 is fluff pulp from Weyerhaeuser. Optionally, another layer of lyocell nonwoven A is put on top of crosslinked fiber layer. The whole composite is pressed to different densities to make a composite structure for ADL testing with the meltblown lyocell layer on top to enhance distribution. Lyocell nonwoven B is used for the same purpose, but it is a dried meltblown lyocell web with a basis weight of 48 g/m². Lyocell nonwoven C is also a dried nonwoven with a basis weight of 80 g/m².

The commercial diaper A used for this test is constructed as follows (from top): nonwoven topsheet, nonwoven acquisition (17 cm×6 cm) at 84 g/m2 basis weight, nonwoven, absorbent core (8.3 gram superabsorbent polymer (SAP) and 11.2 gram of fluff), nonwoven, polymer nonwoven laminated backsheet. The diaper was slit lengthwise along the edge of the nonwoven topsheet to remove the nonwoven acquisition layer. A hairdryer was needed to help break the adhesive bonding between acquisition layer and the nonwoven topsheet. The various lyocell nonwoven composite with crosslinked fiber layers were cut to the same size as the diaper A acquisition layer (17 cm×6 cm) and then inserted into the diaper A surrounds. The diaper A used as a control also had the acquisition layer removed and reinserted to simulate the process used for the lyocell nonwoven samples.

TABLE 5

| | Combination layer properties Layer properties | | | | | Core properties Core properties | | | | | | | | |
|---|---|---|---|---|---|---|---|---|---|---|---|---|---|---|
| | Basis weight total | Basis weight crosslink fiber | Caliper | Weight | Density | Acquisition time seconds doses | | | rewet grams doses | | | total rewet | wicking distance cm doses | | |
| Sample | g/m² | g/m² | mm | grams | g/m³ | 1 | 2 | 3 | 1 | 2 | 3 | grams | 1 | 2 | 3 |
| Comparative 1 | | | | | | | | | | | | | | | |
| Diaper A as is | 91 | 0 | 1.64 | 0.93 | 0.055 | 30 | 25 | 31 | 0.1 | 2.1 | 25.5 | 27.8 | 20.7 | 26.2 | 31.6 |
| Diaper A reconstructed | 91 | 0 | 1.64 | 0.93 | 0.055 | 27 | 25 | 34 | 0.2 | 1.9 | 23 | 25.1 | 18.5 | 26 | 31.4 |
| Comparative 2 | | | | | | | | | | | | | | | |
| A-NB416-A | 125 | 98 | 0.46 | 1.28 | 0.276 | 47 | 60 | 73 | 0.3 | 6.7 | 26.7 | 33.6 | 18.4 | 26.6 | 31 |
| B-NB416-B | 191 | 98 | 0.54 | 1.95 | 0.353 | 51 | 60 | 70 | 0.3 | 9.4 | 30 | 39.7 | 18.5 | 28.1 | 32.3 |
| Comparative 3 | | | | | | | | | | | | | | | |

TABLE 5-continued

| | Combination layer properties Layer properties | | | | | Core properties Core properties | | | | | | | | | |
|---|---|---|---|---|---|---|---|---|---|---|---|---|---|---|---|
| | Basis weight total | Basis weight crosslink fiber | Caliper | Weight | Density | Acquisition time seconds doses | | | rewet grams doses | | | total rewet | wicking distance cm doses | | |
| Sample | g/m² | g/m² | mm | grams | g/m³ | 1 | 2 | 3 | 1 | 2 | 3 | grams | 1 | 2 | 3 |
| C-5% citric acid crosslinked fiber | 83 | 0 | 1.09 | 0.84 | 0.076 | 50 | 60 | 75 | 0.7 | 14.2 | 31.1 | 46.1 | 18.1 | 27 | 32.4 |
| Present invention | | | | | | | | | | | | | | | |
| A-CMC520-A-A-CMC520 (25 g/m²) | 243 | 200 | 4.21 | 2.48 | 0.058 | 27 | 33 | 40 | 1.4 | 14.6 | 33.9 | 49.9 | 16.9 | 23.8 | 30.5 |
| A-PAAT256-A | 133 | 101 | 1.95 | 1.35 | 0.069 | 33 | 37 | 46 | 0.7 | 7.5 | 33.5 | 41.8 | 18.9 | 27.9 | 32.2 |
| A-PAAT256-A | 69 | 39 | 0.97 | 0.7 | 0.071 | 39 | 41 | 52 | 0.2 | 6.6 | 32.6 | 39.4 | 17.8 | 28.1 | 32.2 |
| A-PAAT256-A | 45 | 13 | 0.83 | 0.46 | 0.054 | 43 | 44 | 57 | 0.1 | 4.7 | 28.4 | 33.1 | 17.9 | 27.3 | 32.4 |
| A-CMC520-A | 117 | 87 | 1.61 | 1.19 | 0.072 | 37 | 42 | 52 | 0.6 | 6.5 | 31.2 | 38.3 | 17.8 | 26.9 | 32.1 |
| A-CMC520-A | 68 | 38 | 0.92 | 0.7 | 0.074 | 42 | 50 | 66 | 0.2 | 5.3 | 28.3 | 33.8 | 18.1 | 26.3 | 32.1 |
| A-CMC520-A | 45 | 13 | 0.67 | 0.46 | 0.069 | 45 | 48 | 55 | 0.1 | 6 | 30.6 | 36.7 | 18.5 | 26.8 | 32.1 |
| A-PAAT256 | 99 | 85 | 1.76 | 1.01 | 0.055 | 34 | 35 | 39 | 0.6 | 5.1 | 31.5 | 37.2 | 17.6 | 28 | 32.5 |
| A-PAAT256 | 54 | 39 | 1.11 | 0.55 | 0.049 | 42 | 45 | 58 | 0.3 | 7.5 | 32 | 39.7 | 18.3 | 27.9 | 32.4 |
| A-PAAT256 | 26 | 12 | 0.65 | 0.27 | 0.041 | 49 | 47 | 59 | 0.1 | 6.6 | 28.2 | 34.9 | 18.7 | 27.1 | 32.4 |
| A-CMC520 | 103 | 87 | 1.61 | 1.05 | 0.064 | 39 | 42 | 54 | 1.1 | 7.4 | 28.3 | 36.8 | 17.6 | 26.1 | 31.4 |
| A-CMC520 | 55 | 39 | 1.06 | 0.56 | 0.052 | 42 | 51 | 51 | 0.3 | 5.7 | 31 | 36.9 | 18.8 | 27.5 | 31.9 |
| A-CMC520 | 33 | 17 | 0.55 | 0.34 | 0.06 | 46 | 49 | 58 | 0.1 | 12 | 30.8 | 42.3 | 19.7 | 27.1 | 32.5 |

ADL construction: A is lyocell nonwoven A, B is lyocell nonwoven B.
CMC520 is citric acid crosslinked fiber layer (airlaid), CMC520 (25gsm) is another citric acid crosslinked fiber layer (airlaid) with 25 g/m2 basis weight (BW).
PAAT256 is a polyacrylic acid crosslinked fiber layer. The total basis weight of the crosslinked fiber layer is shown in the table.
NB416 is a fluff (no crosslinking) fiber layer (airlaid).
C-5% citric acid crosslinked is a lyocell nonwoven crosslinked with citric acid chemistry (5% add on).

The same tests were done for another commercial diaper B. This diaper has 6.7 gram of SAP and 3.7 gram of fluff. The diaper B used for this test is constructed as follows (from top): nonwoven topsheet, nonwoven acquisition (24 cm×7 cm) at 63 g/m2 basis weight, crosslinked fiber acquisition/distribution layer (3.93 gram at 229 g/m2), nonwoven, absorbent core (8.3 gram SAP and 11.2 gram of fluff), nonwoven, polymer nonwoven laminated backsheet. The various lyocell nonwoven composite with curly fiber layers were cut to the same size as the diaper B acquisition layer and then inserted into the diaper to replace both nonwoven acquisition and crosslinked fiber acquisition/distribution layer (two layers at a total basis weight of about 290 g/m2 was removed)

TABLE 6

| | Combination layer properties Layer properties | | | | | Core properties Core properties | | | | | | | | | |
|---|---|---|---|---|---|---|---|---|---|---|---|---|---|---|---|
| | Basis weight total | Basis weight crosslink fiber | Caliper | Weight | Density | Acquisition time seconds doses | | | rewet grams doses | | | total rewet | wicking distance cm doses | | |
| Sample | g/m² | g/m² | mm | grams | g/m³ | 1 | 2 | 3 | 1 | 2 | 3 | grams | 1 | 2 | 3 |
| Comparative 1 | | | | | | | | | | | | | | | |
| Diaper B as is | 280 | 0 | 4.63 | 4.7 | 0.061 | 32 | 34 | 42 | 0.1 | 24.2 | 40.3 | 64.5 | 19.3 | 23.5 | 28.3 |
| Diaper B reconstructed | 280 | 0 | 4.63 | 4.7 | 0.061 | 28 | 30 | 36 | 0.1 | 22.2 | 40.7 | 63 | 19.1 | 23.3 | 27.2 |
| Comparative 2 | | | | | | | | | | | | | | | |
| A-NB416-A | 122 | 98 | 0.43 | 2.05 | 0.281 | 77 | 85 | 116 | 0.4 | 27.9 | 41.4 | 69.7 | 19.5 | 25.1 | 28.6 |
| B-NB416-B | 195 | 98 | 0.55 | 3.28 | 0.353 | 96 | 58 | 146 | 0.7 | 23.2 | 38.9 | 62.8 | 19.7 | 27.2 | 30.8 |
| Comparative 3 | | | | | | | | | | | | | | | |
| C-5% citric acid crosslinked | 89 | 0 | 1.14 | 1.49 | 0.078 | 80 | 58 | 91 | 1.1 | | | 37 | 20.8 | | 30 |
| Invention | | | | | | | | | | | | | | | |
| A-CMC520-A-A-CMC520 (25 g/m²) | 229 | 200 | 4.25 | 3.85 | 0.053 | 35 | 39 | 46 | 2.6 | 34.4 | 40.9 | 77.9 | 21.2 | 24.8 | 28.7 |
| A-CMC520-A | 124 | 87 | 1.72 | 2.09 | 0.072 | 54 | 47 | 77 | 0.4 | | 40.6 | | 18.6 | | 27.3 |
| A-PAAT256 | 64 | 28 | 1.35 | 1.07 | 0.047 | 48 | 43 | 61 | 0.2 | | 42.5 | | 20.4 | | 28.1 |
| A-CMC520 | 92 | 67 | 1.48 | 1.55 | 0.062 | 61 | 54 | 82 | 0.5 | | 39.9 | | 19.9 | | 27.7 |
| A-CMC520-A-A-CMC520-A | 342 | 280 | 4.48 | 5.76 | 0.077 | 37 | 45 | 54 | 1.29 | 29.6 | 40.5 | 71.39 | 17 | 22.6 | 26.2 |

TABLE 6-continued

| | Combination layer properties Layer properties | | | | | Core properties Core properties | | | | | | | | | |
|---|---|---|---|---|---|---|---|---|---|---|---|---|---|---|---|
| | Basis weight total | Basis weight crosslink fiber | Caliper | Weight | Density | Acquisition time seconds doses | | | rewet grams doses | | | total rewet | wicking distance cm doses | | |
| Sample | g/m² | g/m² | mm | grams | g/m³ | 1 | 2 | 3 | 1 | 2 | 3 | grams | 1 | 2 | 3 |
| A-PAAT256-A-A-PAAT256-A | 413 | 450 | 5.63 | 6.95 | 0.073 | 26 | 34 | 41 | 1.21 | 27.1 | 37.9 | 66.21 | 14.5 | 21.4 | 26.1 |
| A-PAAT256-A | 212 | 182 | 2.3 | 3.56 | 0.06 | 44 | 47 | 60 | 0.6 | 30.9 | 40.8 | 72.3 | 19 | 24.2 | 26.8 |
| A-PAAT256-A | 265 | 230 | 3.31 | 4.46 | 0.08 | 36 | 42 | 52 | 1.3 | 23.7 | 38.8 | 63.8 | 14.5 | 21 | 26.5 |
| A-CMC520-A | 239 | 200 | 3.12 | 4.02 | 0.077 | 44 | 45 | 59 | 1.3 | 28.4 | 40 | 69.7 | 17 | 25 | 26.7 |
| A-CMC520-A | 131 | 100 | 1.83 | 2.19 | 0.071 | 59 | 61 | 82 | 0.7 | 27.8 | 40 | 68.5 | 21 | 25 | 27.8 |

Lyocell nonwoven/crosslinked fiber composite with lower basis weight can be used as ADL to replace a current ADL layer for similar performance. ADL from lyocell nonwoven/crosslinked fiber showed better performance than lyocell nonwoven/fluff layer (lower acquisition time), or crosslinked lyocell nonwoven layers (for replacing diaper B ADL) due to lower lyocell fiber diameter.

The invention claimed is:

1. A method of making a composite product comprising providing a web of regenerated cellulose material, laying down a layer of airlaid intrafiber crosslinked cellulosic fibers on the web of regenerated cellulose material, fastening the web and layer together to form a composite product.

2. The method of claim 1 wherein the fastening is by spunlacing, thermobonding, adhesive bonding, pressing or a combination thereof.

3. The method of claim 2 wherein the fastening is by spunlacing.

4. The method of claim 3 wherein the spunlacing is from one side of the product.

5. The method of claim 3 wherein the spunlacing is from both sides of the product.

6. The method of claim 1 wherein the regenerated cellulose material is lyocell.

7. The method of claim 6 wherein the fastening is by spunlacing, thermobonding, adhesive bonding, pressing or a combination thereof.

8. The method of claim 7 wherein the fastening is by spunlacing.

9. The method of claim 8 wherein the spunlacing is from one side of the product.

10. The method of claim 8 wherein the spunlacing is from both sides of the product.

11. A method of making a composite product comprising providing a first and second webs of regenerated cellulose material, laying down a layer of airlaid intrafiber crosslinked cellulosic fibers on the first web of regenerated cellulose,
   overlaying the second web of regenerated cellulose on the layer of intrafiber crosslinked cellulosic fibers on the side of the cellulosic fibers opposite the first web of regenerated cellulose,
   fastening the webs together to form a composite product.

12. The method of claim 11 wherein the fastening is by spunlacing, thermobonding, adhesive bonding, pressing or a combination thereof.

13. The method of claim 12 wherein the fastening is by spunlacing.

14. The method of claim 13 wherein the spunlacing is from one side of the product.

15. The method of claim 13 wherein the spunlacing is from both sides of the product.

16. The method of claim 11 wherein the regenerated cellulose material is lyocell.

17. The method of claim 16 wherein the fastening is by spunlacing, thermobonding, adhesive bonding, pressing or a combination thereof.

18. The method of claim 17 wherein the fastening is by spunlacing.

19. The method of claim 18 wherein the spunlacing is from one side of the product.

20. The method of claim 18 wherein the spunlacing is from both sides of the product.

* * * * *